US008602400B2

(12) United States Patent
Ward et al.

(10) Patent No.: US 8,602,400 B2
(45) Date of Patent: Dec. 10, 2013

(54) METHOD AND APPARATUS FOR IMPROVED VIBRATION ISOLATION

(75) Inventors: Emery N. Ward, Fort Worth, TX (US); Michael R. Smith, Colleyville, TX (US); Frank B. Stamps, Colleyville, TX (US); David Haynie, Euless, TX (US); Terry K. Thompson, Bedford, TX (US); David P. Shipman, Mansfield, TX (US); James A. Wilson, Va Italy (IT)

(73) Assignee: Textron Innovations Inc., Providence, RI (US)

( * ) Notice: Subject to any disclaimer, the term of this patent is extended or adjusted under 35 U.S.C. 154(b) by 651 days.

(21) Appl. No.: 12/677,611

(22) PCT Filed: Sep. 27, 2007

(86) PCT No.: PCT/US2007/079686
§ 371 (c)(1),
(2), (4) Date: Mar. 11, 2010

(87) PCT Pub. No.: WO2009/041975
PCT Pub. Date: Apr. 2, 2009

(65) Prior Publication Data
US 2010/0301160 A1 Dec. 2, 2010

(51) Int. Cl.
*F16F 9/04* (2006.01)
(52) U.S. Cl.
USPC .................. 267/136; 267/141.3; 267/293
(58) Field of Classification Search
USPC ......... 267/136, 140.11–140.13, 141.1–141.7, 267/293; 244/54; 188/298, 378–380; 248/562, 636, 638
See application file for complete search history.

(56) References Cited

U.S. PATENT DOCUMENTS

| 2,819,131 | A | * | 1/1958 | Lankford | 92/251 |
|---|---|---|---|---|---|
| 4,236,607 | A | | 12/1980 | Halwes et al. | |
| 4,700,934 | A | | 10/1987 | Andra et al. | |
| 4,811,919 | A | * | 3/1989 | Jones | 244/54 |
| 5,439,082 | A | | 8/1995 | McKeown et al. | |
| 6,009,983 | A | * | 1/2000 | Stamps et al. | 188/298 |
| 6,394,432 | B1 | * | 5/2002 | Whiteford | 267/140.13 |
| 6,431,530 | B1 | * | 8/2002 | Stamps et al. | 267/136 |
| 6,695,106 | B2 | * | 2/2004 | Smith et al. | 188/378 |
| 2004/0119214 | A1 | | 6/2004 | Okanaka et al. | |
| 2006/0151272 | A1 | | 7/2006 | Smith et al. | |

FOREIGN PATENT DOCUMENTS

JP 11030267 A 2/1999
WO 9854486 A1 12/1998

OTHER PUBLICATIONS

International Search Report and Written Opinion for PCT/US07/79686 dated Sep. 10, 2008.
International Preliminary Report on Patentability for PCT/US07/79686 dated Dec. 14, 2010.

(Continued)

*Primary Examiner* — Christopher Schwartz
(74) *Attorney, Agent, or Firm* — James E. Walton; J. Oliver Williams (57) ABSTRACT

A vibration isolator is disclosed having a housing which defines a fluid chamber. A piston, which is movable to and from a down position, is disposed within the housing. A vibration isolation fluid is disposed within the fluid chamber. A passage having a predetermined diameter extends through the piston to permit the vibration isolation fluid to flow from one fluid chamber to the other. An elastic element is provided for reducing transmission of vibrations from the piston to the housing when the piston is at the down position.

20 Claims, 13 Drawing Sheets

(56) References Cited

OTHER PUBLICATIONS

First Examination Report in related Canadian Application No. 2,704,734 by the Canadian Intellectual Property Office, dated Mar. 9, 2012.
Third Office Action in Chinese Application No. 200780100866.8 by Chinese Patent Office, dated Mar. 27, 2012.
Second Office Action in Chinese Application No. 200780100866.8 by Chinese Patent Office, dated Nov. 2, 2011.
First Office Action in Chinese Application No. 200780100866.8 by Chinese Patent Office, dated Apr. 25, 2011.
Extended European Search Report from European Patent Office in related European Application No. 07872774, mailed Oct. 18, 2012, 7 pages.

* cited by examiner

METHOD AND APPARATUS FOR IMPROVED VIBRATION ISOLATION

TECHNICAL FIELD

The present invention relates in general to vibration control. The present invention relates generally to a method and apparatus for isolating mechanical vibrations in a structure or body which is subject to harmonic or oscillating displacements or forces, and is of particular utility in the field of aircraft, in particular, helicopters and other rotary wing aircraft.

DESCRIPTION OF THE PRIOR ART

For many years, effort has been directed toward the design of apparatus for isolating a vibrating body from transmitting its vibrations to another body. Such apparatus are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

A simple force equation for vibration is set forth as follows:

$$F = m\ddot{x} + c\dot{x} + kx$$

Vibration isolators are distinguishable from dampening devices. A true vibration isolator utilizes acceleration of a tuning mass body $m\ddot{x}$ to cancel the displacement of vibration $kx$. On the other hand, a dampening device is concerned with velocity $c\dot{x}$ of a fluid or other body which may involve restricting flow, and does not cancel vibration, but merely dissipates it. Unfortunately, dampening devices are often erroneously referred to as isolators.

One important engineering objective during the design of an aircraft vibration-isolation system is to minimize the length, weight, and overall size, including cross-section, of the isolation device. This is a primary objective of all engineering efforts relating to aircraft. It is especially important in the design and manufacture of helicopters and other rotary wing aircraft, such as tilt rotor aircraft, which are required to hover against the dead weight of the craft, and which are, thus, somewhat constrained in their payload in comparison with fixed-wing aircraft.

Another important engineering objective during the design of vibration-isolation systems is the conservation of the engineering resources that have been expended in the design of other aspects of the aircraft or in the vibration-isolation system. In other words, it is an important industry objective to make incremental improvements in the performance of vibration isolation systems which do not require radical re-engineering or complete redesign of all of the components which are present in the existing vibration-isolation systems.

A marked departure in the field of vibration isolation, particularly as applied to aircraft and helicopters, is disclosed in commonly assigned U.S. Pat. No. 4,236,607, titled "Vibration Suppression System," issued 2 Dec. 1980, to Halwes, et al. (Halwes '607). Halwes '607 is incorporated herein by reference. Halwes '607 discloses a vibration isolator in which a dense, low-viscosity fluid is used as the "tuning" mass to counterbalance, or cancel, oscillating forces transmitted through the isolator. This isolator employs the principle that the acceleration of an oscillating mass is 180° out of phase with its displacement.

Halwes '607, it was recognized that the inertial characteristics of a dense, low-viscosity fluid, combined with a hydraulic advantage resulting from a piston arrangement, could harness the out-of-phase acceleration to generate counterbalancing forces to attenuate or cancel vibration. Halwes '607 provided a much more compact, reliable, and efficient isolator than was provided in the prior art. The original dense, low-viscosity fluid contemplated by Halwes '607 was mercury, which is toxic and highly corrosive.

Since Halwes' early invention, much of the effort in this area has been directed toward replacing mercury as a fluid or to varying the dynamic response of a single isolator to attenuate differing vibration modes. An example of the latter is found in commonly assigned U.S. Pat. No. 5,439,082, titled "Hydraulic Inertial Vibration Isolator," issued 8 Aug. 1995, to McKeown, et al. (McKeown '082). McKeown '082 is incorporated herein by reference.

Several factors affect the performance and characteristics of the Halwes-type isolator, including the density and viscosity of the fluid employed, the relative dimensions of components of the isolator, and the like. One improvement in the design of such isolators is disclosed in commonly assigned U.S. Pat. No. 6,009,983, titled "Method and Apparatus for Improved Isolation," issued 4 Jan. 2000, to Stamps et al. (Stamps '983). In Stamps '983, a compound radius at the each end of the tuning passage was employed to provide a marked improvement in the performance of the isolator. Stamps '983 is incorporated herein by reference.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
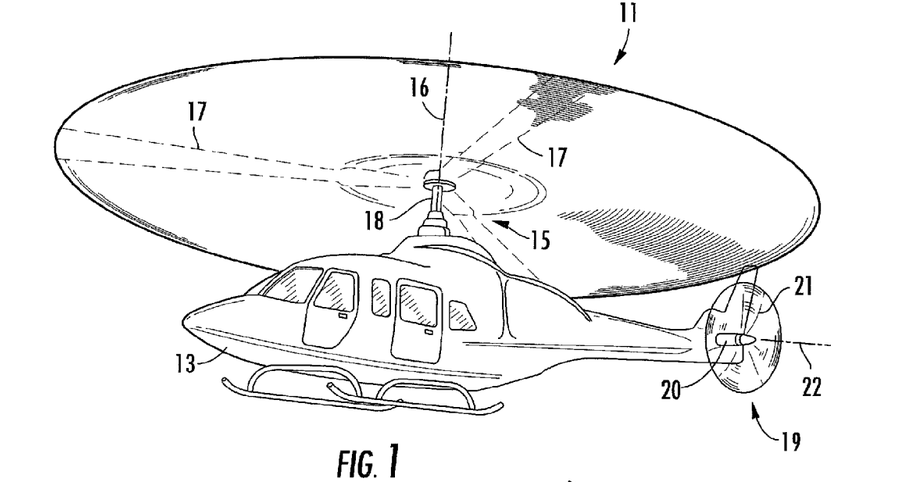
FIG. 1 is a perspective view of a helicopter according to the present application.

Referring to FIG. 1 in the drawings, a helicopter 11 is illustrated. Helicopter 11 has a fuselage 13 and a main rotor assembly 15, including main rotor blades 17 and a main rotor shaft 18. Helicopter 11 has a tail rotor assembly 19, including tail rotor blades 21 and a tail rotor shaft 20. Main rotor blades 17 generally rotate about a longitudinal axis 16 of main rotor shaft 18. Tail rotor blades 21 generally rotate about a longitudinal axis 22 of tail rotor shaft 20. Helicopter 11 also includes a vibration isolation system according to the present disclosure for isolating fuselage 13 or other portions of helicopter 11 from mechanical vibrations, such as harmonic vibrations, which are associated with the propulsion system and which arise from the engine, transmission, and rotors of helicopter 11.

Figure 2A:
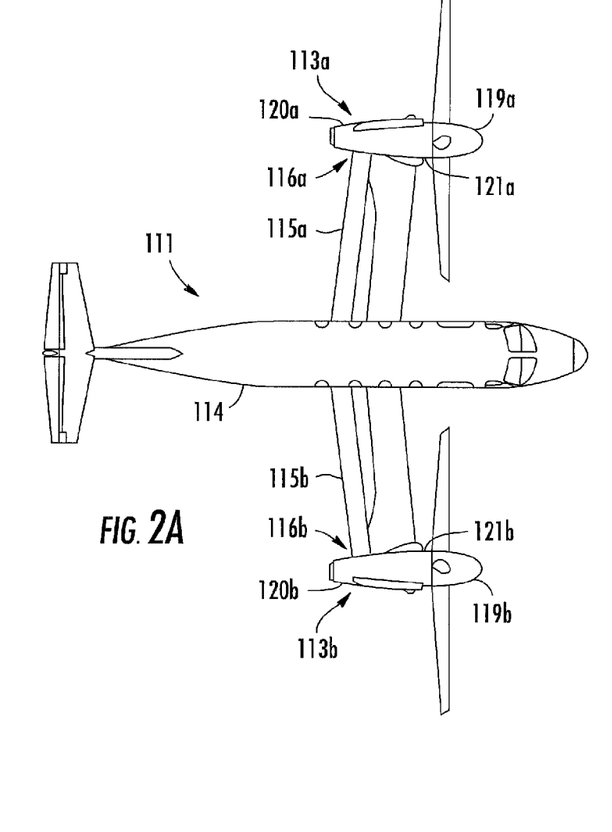
FIG. 2A is a plan view of a tilt rotor aircraft according to the present application in an airplane mode.
Figure 2B:
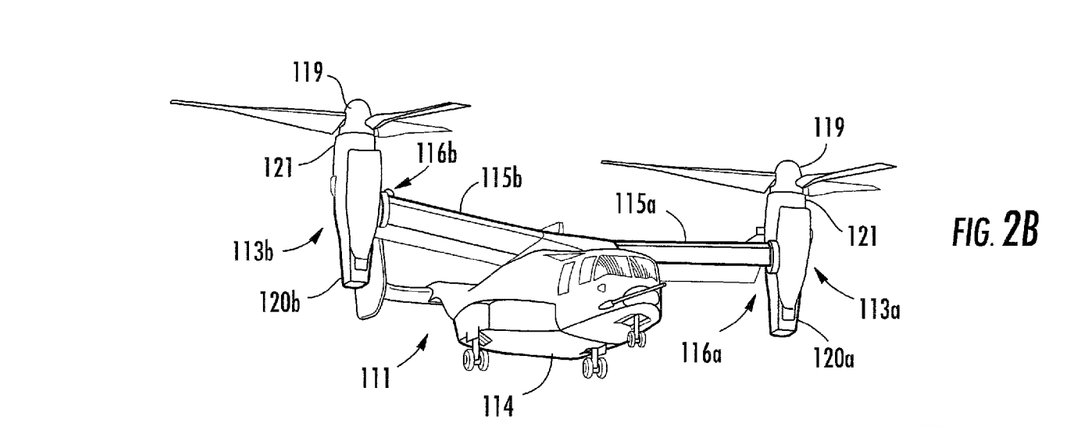
FIG. 2B is a perspective view of a tilt rotor aircraft according to the present application in a helicopter mode.

The present disclosure applies also to other types of rotary wing aircraft. Referring now to FIGS. 2A and 2B in the drawings, a tilt rotor aircraft 111 is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode, in which tilt rotor assemblies 113a and 113b are tilted upward such that tilt rotor aircraft 111 flies like a conventional helicopter, and an airplane mode, in which tilt rotor assemblies 113a and 113b are tilted forward such that tilt rotor aircraft 111 flies like a conventional propeller-driven aircraft. In FIG. 2A, tilt rotor aircraft 111 is shown in the airplane mode; in FIG. 2B, tilt rotor aircraft 111 is shown in the helicopter mode. As shown in FIGS. 2A and 2B, wings 115a and 115b are coupled to a fuselage 114. Tilt rotor aircraft 111 also includes a vibration isolation system according to the present disclosure for isolating fuselage 114 or other portions of tilt rotor aircraft 111 from mechanical vibrations, such as harmonic vibrations, which are associated with the propulsion system and which arise from the engines, transmissions, and rotors of tilt rotor aircraft 111.

Figure 3:
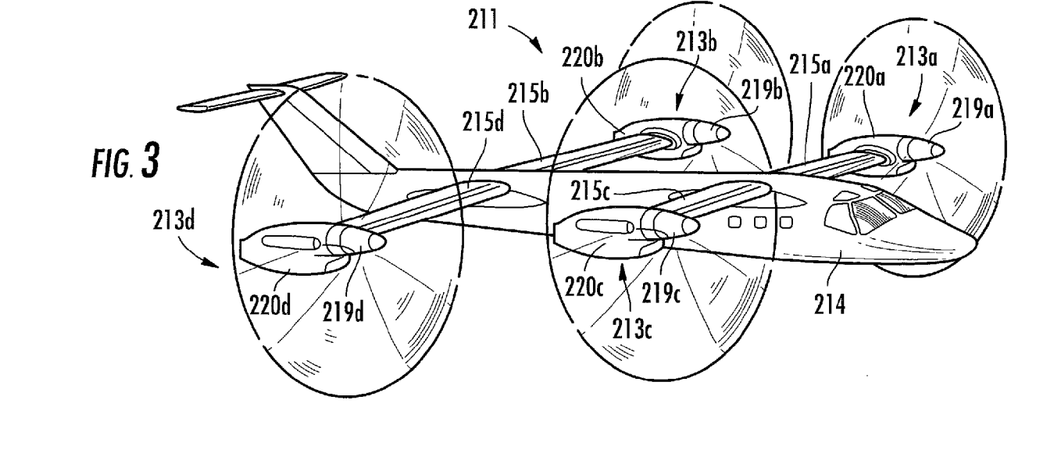
FIG. 3 is a perspective view of a quad tilt rotor aircraft according to the present application in an airplane mode.

Referring now to FIG. 3 in the drawings, a quad tilt rotor aircraft 211 is illustrated. As with the tilt rotor aircraft of FIGS. 2A and 2B, rotor assemblies 213a, 213b, 213c, and 213d are carried by wings 215a, 215b, 215c, and 215d, respectively. Tilt rotor assemblies 213a, 213b, 213c, and 213d include nacelles 220a, 220b, 220c, and 220d, which carry the engines and transmissions of quad tilt rotor aircraft 211, as well as rotor hubs 219a, 219b, 219c, and 219d on forward ends of tilt rotor assemblies 213a, 213b, 213c, and 213d, respectively.

Tilt rotor assemblies 213a, 213b, 213c, and 213d move or rotate relative to wing members 215a, 215b, 215c, and 215d between a helicopter mode, in which tilt rotor assemblies 213a, 213b, 213c, and 213d are tilted upward such that quad tilt rotor aircraft 211 flies like a conventional helicopter, and an airplane mode, in which tilt rotor assemblies 213a, 213b, 213c, and 213d are tilted forward such that quad tilt rotor aircraft 211 flies like a conventional propeller-driven aircraft. In FIG. 3, quad tilt rotor aircraft 211 is shown in the airplane mode. As shown in FIG. 3, wings 215a, 215b, 215c, and 215d are coupled to a fuselage 214. Tilt rotor aircraft 211 also includes a vibration isolation system according to the present disclosure for isolating fuselage 214 or other portions of quad tilt rotor aircraft 211 from mechanical vibrations, such as harmonic vibrations, which are associated with the propulsion system and which arise from the engines, transmissions, and rotors of quad tilt rotor aircraft 211.

It should be understood that the vibration isolation system according to the present disclosure may be used with any aircraft on which it would be desirable to have vibration isolation, including unmanned aerial vehicles that are remotely piloted.

Figure 4A:
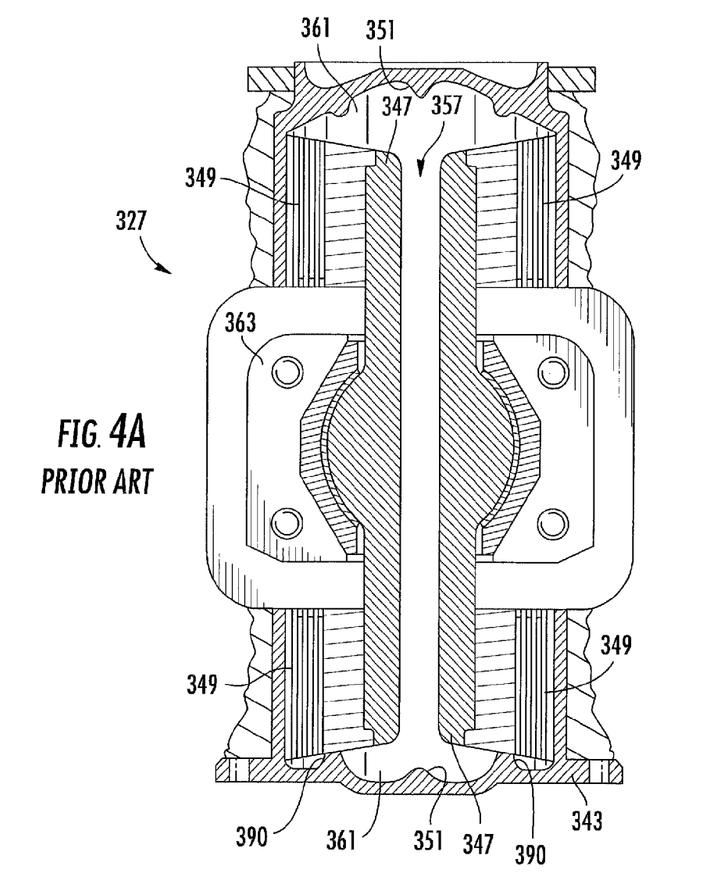
FIG. 4A is a cross-sectional view of a prior-art liquid inertia vibration eliminator.

Referring now to FIG. 4A in the drawings, a prior-art liquid inertia vibration eliminator (LIVE unit) 327 for use on an aircraft is illustrated. Prior-art LIVE unit 327 includes a metal housing 343 that has a hollow, generally cylindrical interior. A metal piston 347 of selected cross-sectional diameter is disposed within the interior of housing 343. Housing 343 would typically be coupled to the fuselage of an aircraft (not shown) and piston 347 would typically be coupled to the transmission and propulsion system of the aircraft (not shown), generally referred to as a pylon assembly, at an attachment bracket 363. In such an arrangement, the fuselage serves as the body to be isolated from vibration, and the transmission of the aircraft serves as the vibrating body. An elastomeric seal and spring member 349 resiliently seals piston 347 within the interior of housing 343.

A fluid chamber 361 is defined by the interior of housing 343 and piston 347 and is sealed against leakage by elastomer member 349. A known-density, low-viscosity vibration-isolation fluid, also referred to as tuning fluid, is disposed within fluid chamber 361. In addition to sealing the vibration-isolation fluid in fluid chamber 361, elastomer member 349 functions as a spring to permit piston 347 to move or oscillate relative to housing 343, while maintaining piston 347 in a central location in housing 343 when no load is applied.

A tuning port or passage 357 extends centrally through piston 347 and permits the vibration-isolation fluid to move from one end of fluid chamber 361 to the other. A conical flow diverter 351 is provided at each end of housing 343 and is aligned with and generally opposes the opening at each end of tuning passage 357. Each conical flow diverter 351 enhances fluid flow by decelerating the vibration-isolation fluid as it flows from each end of the fluid chamber into and out of passage 357.

Figure 4B:
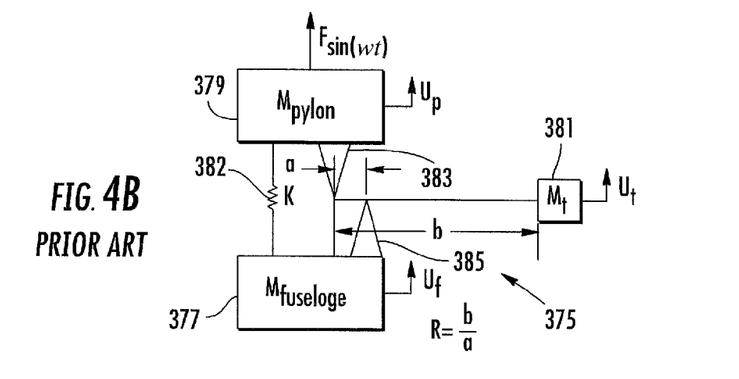
FIG. 4B is a force diagram of the prior-art liquid inertia vibration eliminator of FIG. 4A.

Referring now to FIG. 4B in the drawings, a mechanical equivalent model 375 for the prior art LIVE unit 327 of FIG. 4A is illustrated. In mechanical equivalent model 375, a box 377 represents the mass of the fuselage $M_{fuselage}$; a box 379 represents the mass of the pylon assembly $M_{pylon}$, and a box 381 represents the mass of the tuning mass $M_t$, in this case, the vibration-isolation fluid. A vibratory force $F \cdot \sin(\omega t)$ is generated by the engine, transmission, and propulsion system. Force $F \cdot \sin(\omega t)$ is a function of the frequency of vibration of the transmission and propulsion system.

Force $F \cdot \sin(\omega t)$ causes an oscillatory displacement $u_p$ of the pylon assembly; an oscillatory displacement of the fuselage $u_f$; and an oscillatory displacement of the tuning mass $u_t$. Elastomer member 349 is represented by a spring 382 disposed between the fuselage $M_{fuselage}$ and the pylon assembly $M_{pylon}$. Spring 382 has a spring constant k.

In mechanical equivalent model 375, tuning mass $M_t$ functions as if cantilevered from a first fulcrum 383 attached to the pylon assembly $M_{pylon}$, and a second fulcrum 385 attached to the fuselage $M_{fuselage}$. The distance a from first fulcrum 383 to second fulcrum 385 represents the cross-sectional area of tuning port 357, and the distance b from first fulcrum 383 to the tuning mass $M_t$ represents the cross-sectional area of piston 347, such that an area ratio, or hydraulic ratio, R is equal to the ratio of b to a.

Referring again to FIG. 4A, the metal housing 343 includes a plurality of metal downstops 390. In some situations, such as when the aircraft is resting on the ground, the metal piston 347 is in contact with the metal downstops 390. This metal to metal contact can allow for undesirable transfer of vibrations from the engine, transmission, and propulsion system, through the piston 347, to the fuselage via the downstops 390 and housing 343. On the other hand, the present disclosure provides a means of reducing vibration levels in the fuselage that originate from the engine, transmission, and propulsion system.

Figure 5:
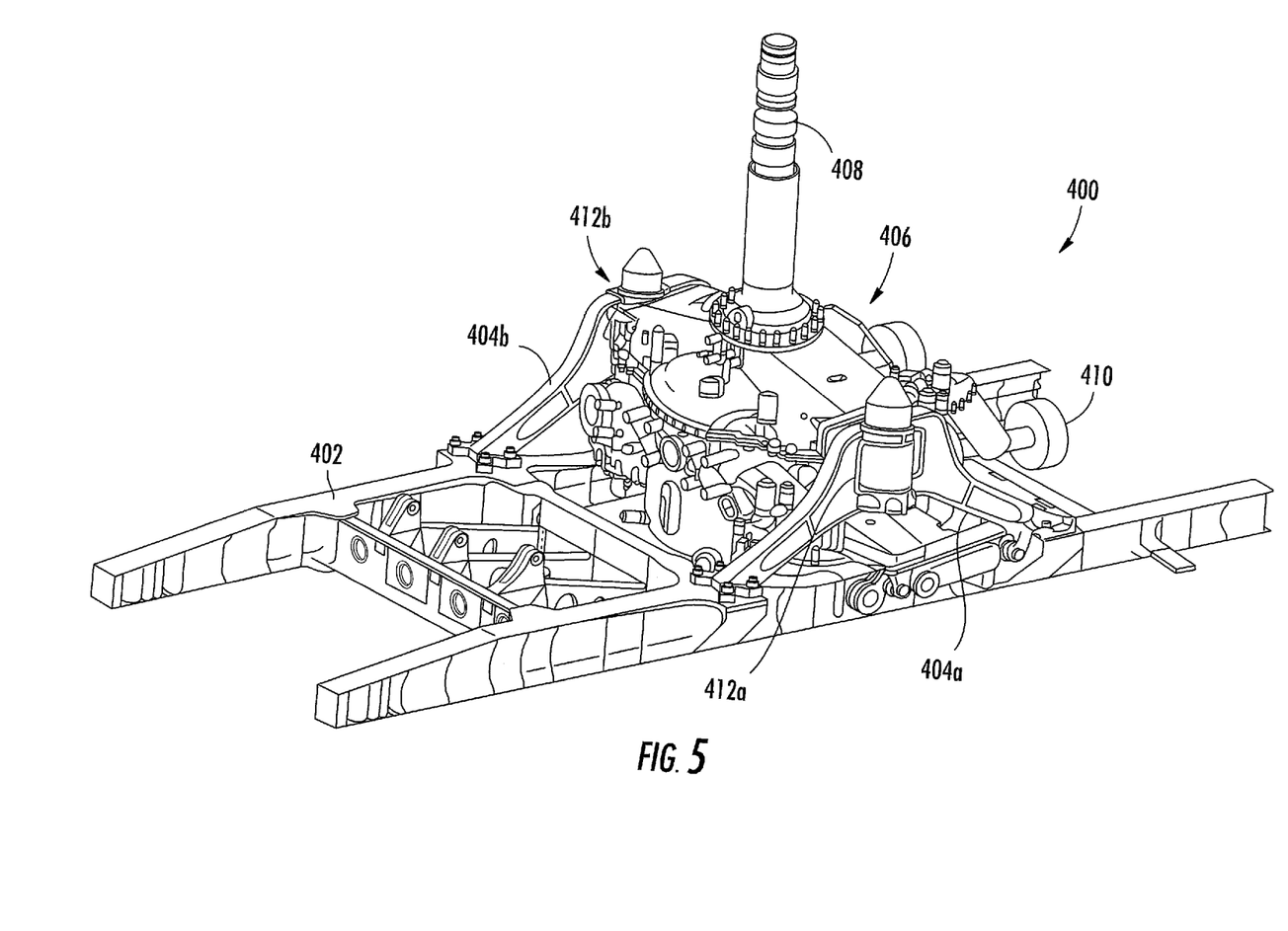
FIG. 5 is a perspective view of an airframe roof beam and pylon assembly according to the present application.

Referring now to FIG. 5 in the drawings, a perspective view of an airframe roof beam and pylon assembly 400 is illustrated. The assembly 400 includes a partial airframe roof beam 402 and pylon support beams 404a and 404b mounted to the airframe 402 for supporting the pylon. The pylon generally refers to the propulsion system, which includes a rotor assembly (not shown) and a transmission 406. A main rotor shaft 408, on which a main rotor assembly (not shown) can be mounted, extends upwardly from the transmission 406. The transmission 406 can be driven by an engine (not shown) via a shaft 410 to turn the main rotor shaft 408. The resulting vibrations are isolated from the airframe 402 by LIVE units 412a and 412b.

Figure 6A:
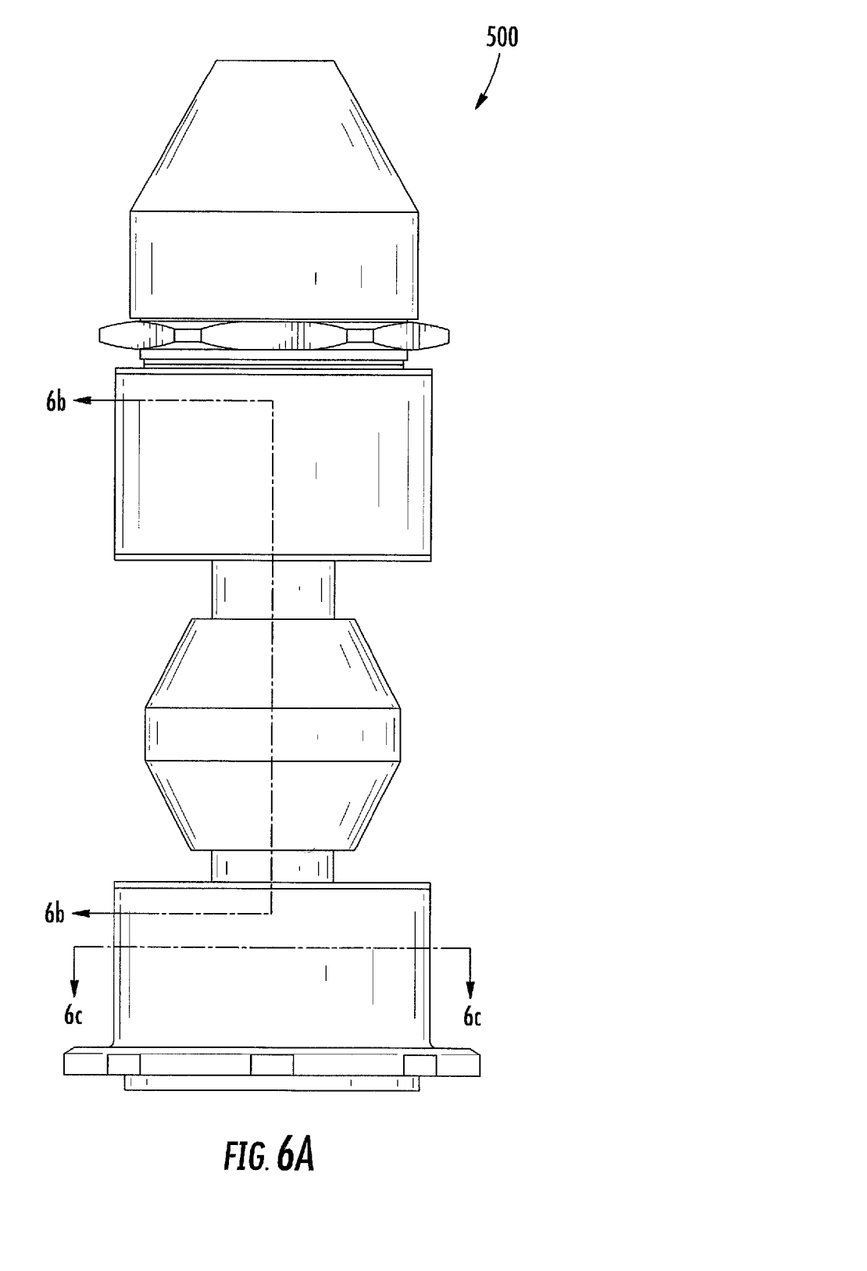
FIG. 6A is a side view of an embodiment of a liquid inertia vibration eliminator unit according to the present application.
Figure 6B:
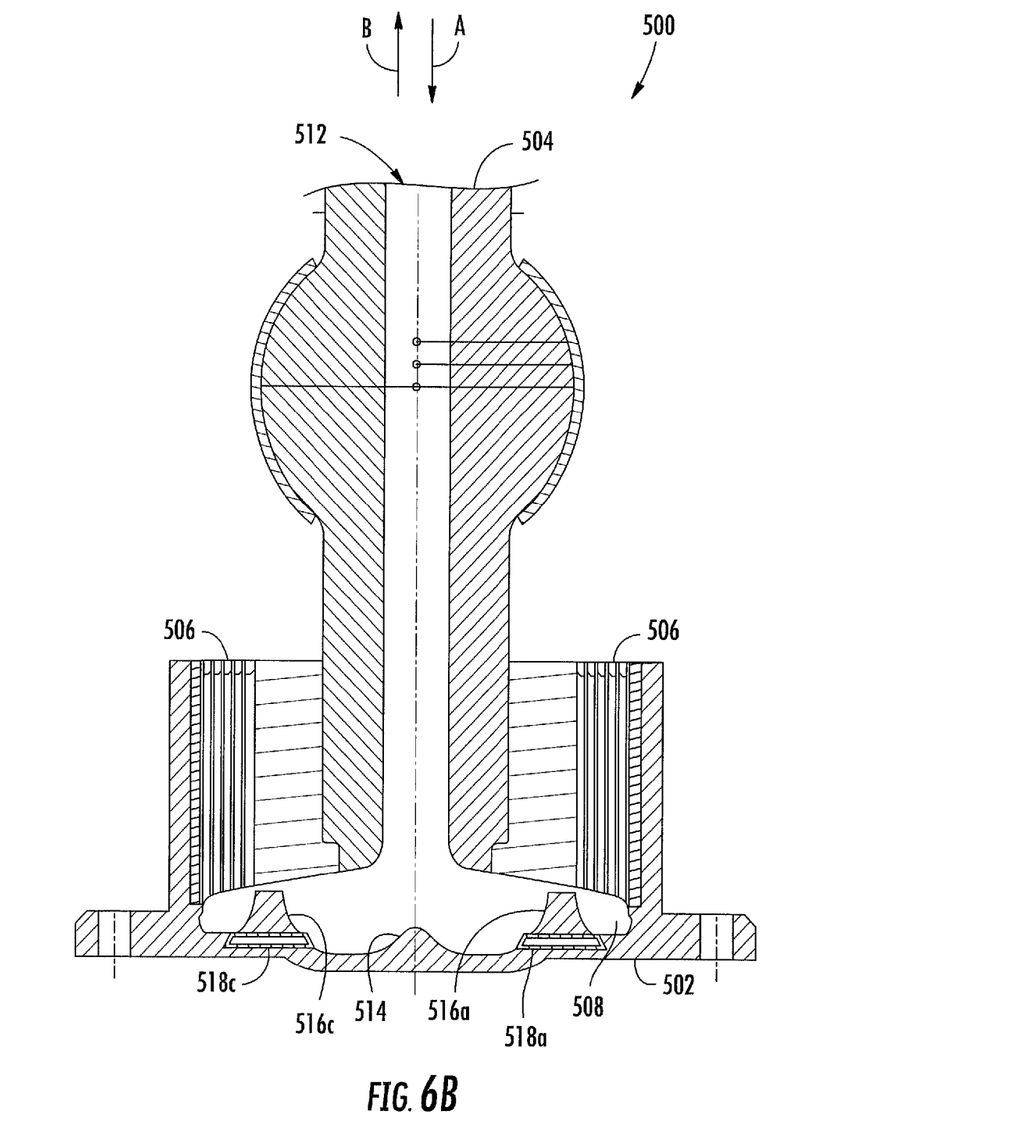
FIG. 6B is a first cross-sectional view of the liquid inertia vibration eliminator unit shown in FIG. 6A taken at 6*b*-6*b* in FIG. 6A.
Figure 6C:
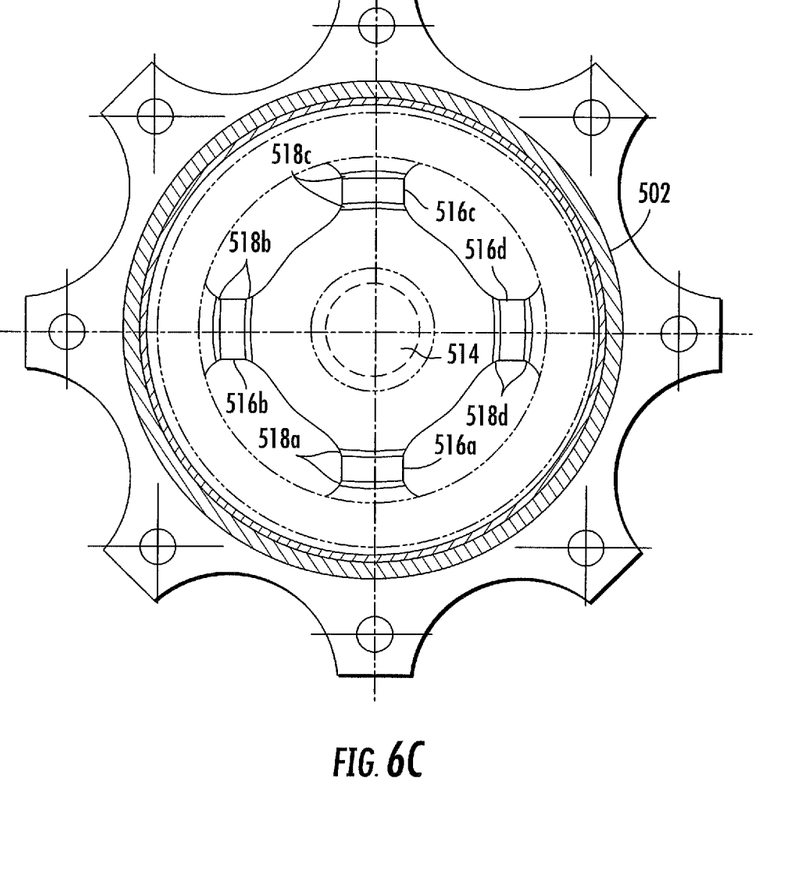
FIG. 6C is a second cross-sectional view of the liquid inertia vibration eliminator unit shown in FIG. 6A taken at 6*c*-6*c* in FIG. 6A.

Referring now to FIGS. 6A-6C in the drawings, an embodiment of a LIVE unit 500 is shown that can be used as the LIVE units 412a and 412b. FIG. 6A shows a side view of the LIVE unit 500. The LIVE unit 500 is particularly well-suited for use on a helicopter, but can also be used on other aircraft. FIG. 6B shows a cross-sectional view of the LIVE unit 500 taken along section line 6b-6b in FIG. 6A. FIG. 6C shows a cross-sectional view of the LIVE unit 500 taken along section line 6c-6c in FIG. 6A.

Referring to FIG. 6B, the LIVE unit 500 includes a housing 502 having a hollow, generally cylindrical interior. Housing 502 would typically be coupled to the fuselage of the aircraft, i.e., the body being isolated from the vibration. A piston 504 of selected cross-sectional diameter is disposed within the interior of housing 502. Piston 504 would typically be coupled to the pylon of the aircraft, i.e., the rotor assembly and transmission, which are a primary source of vibrations. An elastomeric seal and spring member 506 resiliently seals piston 504 within the interior of housing 502.

A fluid chamber 508 is defined by the interior of housing 502 and piston 504. A known-density, vibration-isolation fluid, also referred to as tuning fluid, is disposed within fluid chamber 508. Tuning fluid is preferably organic with non-corrosive properties having low-viscosity and high density, similar to the SPF I family of fluids available from Lord Corporation. In addition to sealing tuning fluid within fluid chamber 508, elastomeric member 506 functions as a spring to permit piston 504 to move or oscillate relative to housing 502, while maintaining piston 504 in a central location within housing 502 when no load is applied.

A tuning port 512 extends centrally through piston 504 and permits tuning fluid to move from one end of fluid chamber 508 to the other. A conical flow diverter 514 is provided at each end of housing 502 and is aligned with and generally opposes the opening at each end of tuning passage 512. Each conical flow diverter 514 enhances fluid flow by decelerating the vibration-isolation fluid as it flows from each end of the fluid chamber into and out of passage 512.

Referring next to both FIGS. 6B and 6C, the housing 502 includes a plurality of downstops 516, including downstops 516a, 516b, 516c, and 516d. Elastic members 518a-d, for example formed of rubber, extend beneath the downstops 516a-d, respectively, such that elastic members 518a-d are provided between the downstops 516a-d and the housing 502. The piston 504 is movable relative to the housing 502 in the directions indicated by arrows A and B. From the position illustrated, the piston can move in the direction indicated by arrow A (down as shown in FIG. 6B) to a down position, where the travel of the piston is stopped by the downstops 516a-d, and from the down position in the direction indicated by arrow B (up as shown in FIG. 6B). The placement of the elastic members 518a-d between the downstops 516a-d and the housing 502 provides for a compliant base, rather than a hard base, for the pylon to rest on when the piston 504 is in the down position, for example when the aircraft is on the ground. If the pylon rests on a hard surface, the pylon lateral mode natural frequency increases and approaches main rotor 4/rev harmonic frequency (i.e., blade passage frequency). This resonant or near-resonant condition results in increased vibration levels, which are transferred to the fuselage through the downstop and housing. By incorporating the elastic members 518a-d, the pylon lateral mode natural frequency does not approach resonance with 4/rev; therefore, the vibration levels do not significantly increase when the pylon rests on the downstops 516a-d.

Figure 7A:
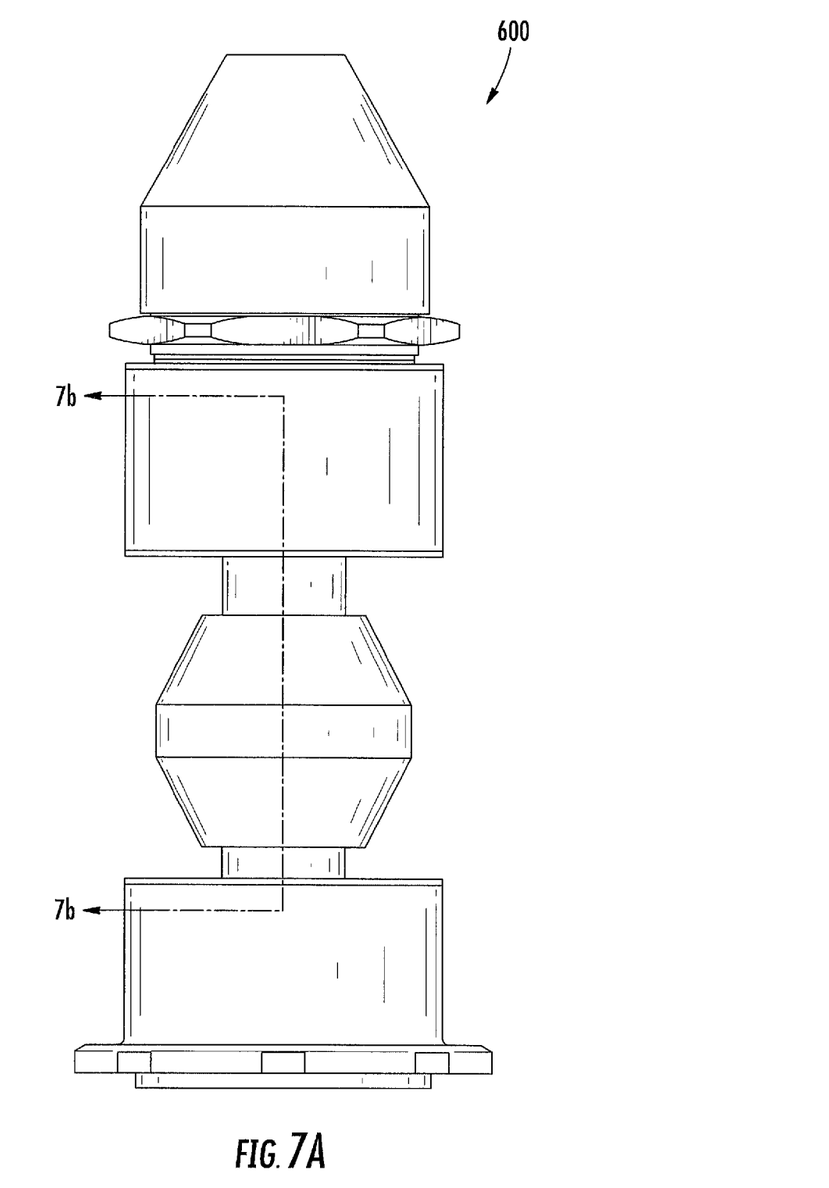
FIG. 7A is a side view of another embodiment of a liquid inertia vibration eliminator unit according to the present application.
Figure 7B:
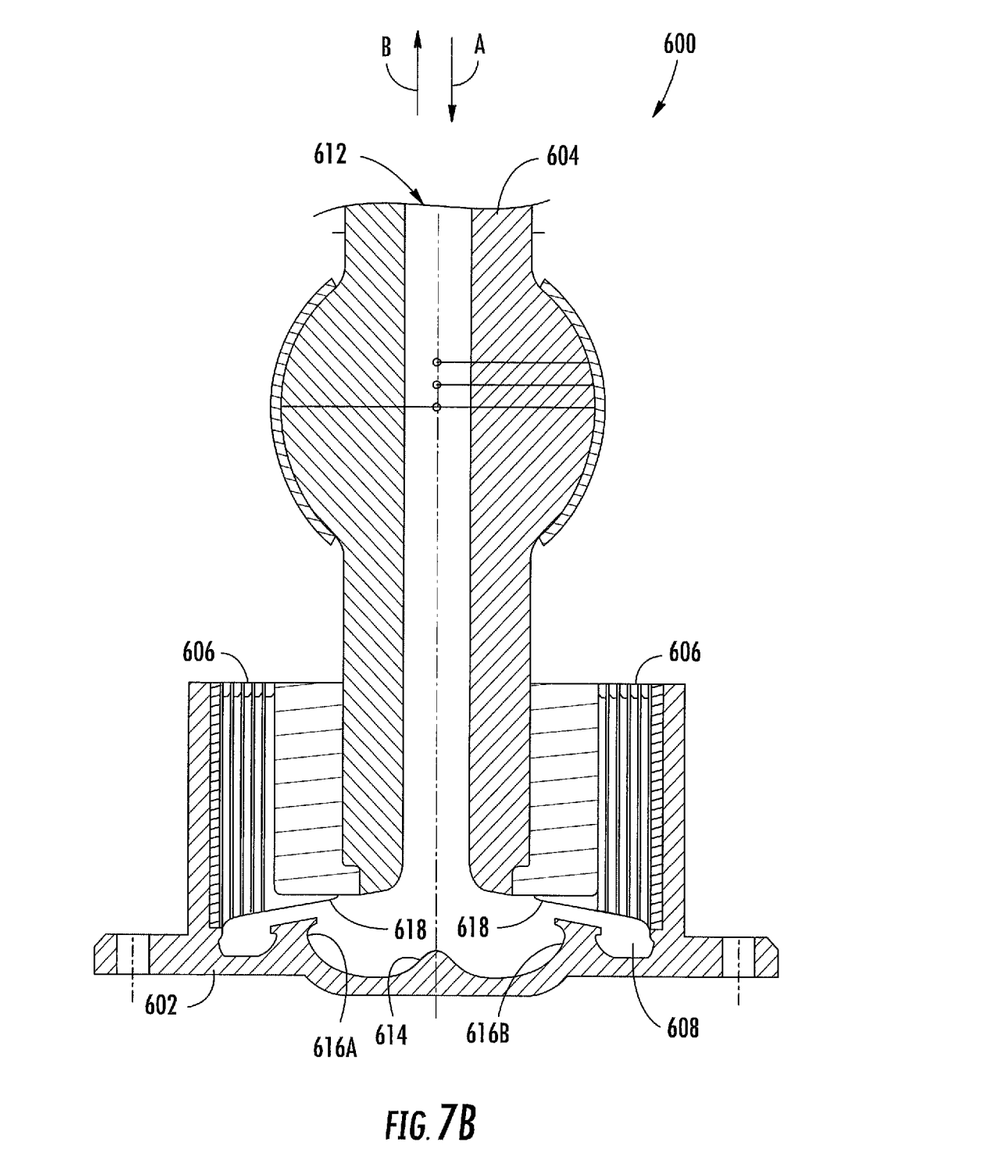
FIG. 7B is a cross-sectional view of the liquid inertia vibration eliminator unit shown in FIG. 7A taken at 7b-7b in FIG. 7A.

Referring next to FIGS. 7A and 7B, an alternative embodiment is shown as LIVE unit 600, which can also be used as the LIVE units 412a and 412b (FIG. 5). FIG. 7A shows a side view of the LIVE unit 600. The LIVE unit 600 is particularly well-suited for use on a helicopter, but can also be used on other aircraft. FIG. 7B shows a cross-sectional view of the LIVE unit 600 taken along section line 7b-7b in FIG. 7A.

Referring to FIG. 7B, the LIVE unit 600 includes a housing 602 having a hollow, generally cylindrical interior. Housing 602 would typically be coupled to the fuselage of the aircraft, i.e., the body being isolated from the vibration. A piston 604 of selected cross-sectional diameter is disposed within the interior of housing 602. Piston 604 would typically be coupled to the pylon of the aircraft, i.e., the rotor assembly and transmission, which are a primary source of vibrations. An elastomeric seal and spring member 606 resiliently seals piston 604 within the interior of housing 602.

A fluid chamber 608 is defined by the interior of housing 602 and piston 604. A known-density, vibration-isolation fluid, also referred to as tuning fluid, is disposed within fluid chamber 608. Tuning fluid is preferably organic with non-corrosive properties having low-viscosity and high density, similar to the SPF I family of fluids available from Lord Corporation. In addition to sealing tuning fluid within fluid chamber 608, elastomeric member 606 functions as a spring to permit piston 604 to move or oscillate relative to housing 602, while maintaining piston 604 in a central location within housing 602 when no load is applied.

A tuning port 612 extends centrally through piston 604 and permits tuning fluid to move from one end of fluid chamber 608 to the other. A conical flow diverter 614 is provided at each end of housing 602 and is aligned with and generally opposes the opening at each end of tuning passage 612. Each conical flow diverter 614 enhances fluid flow by decelerating the vibration-isolation fluid as it flows from each end of the fluid chamber into and out of passage 612.

The housing 602 includes a plurality of downstops 616, including downstops 616*a* and 616*b*. The housing 602 can include an array of downstops, for example arranged in the same or similar manner as the downstops 516*a*-*d* are arranged in FIG. 6C. Elastic member 618, for example formed of rubber, extends beneath the piston 604 from the elastomeric member 606 towards the passage 612. The elastic member 618 extends over at least enough of the piston 604 so that the elastic member 618 is between the downstops 616*a* and 616*b* and the piston 604. The piston 604 is movable relative to the housing 602 in the directions indicated by arrows A and B. From the position illustrated, the piston can move in the direction indicated by arrow A (down as shown in FIG. 7B) to a down position, where the travel of the piston is stopped by the downstops 616*a* and 616*b*, and from the down position in the direction indicated by arrow B (up as shown in FIG. 7B). The placement of the elastic member 618 between the downstops 616*a* and 616*b* and the piston 604 provides for a compliant base, rather than a hard base, for the pylon to rest on when the piston 604 is in the down position, for example when the aircraft is on the ground. If the pylon rests on a hard surface, the pylon lateral mode natural frequency increases and approaches main rotor 4/rev harmonic frequency (i.e., blade passage frequency). This resonant or near-resonant condition results in increased vibration levels, which are transferred to the fuselage through the downstop and housing. By incorporating the elastic member 618, the pylon lateral mode natural frequency does not approach resonance with 4/rev; therefore, the vibration levels do not significantly increase when the pylon rests on the downstops 616*a* and 616*b*.

Figure 8A:
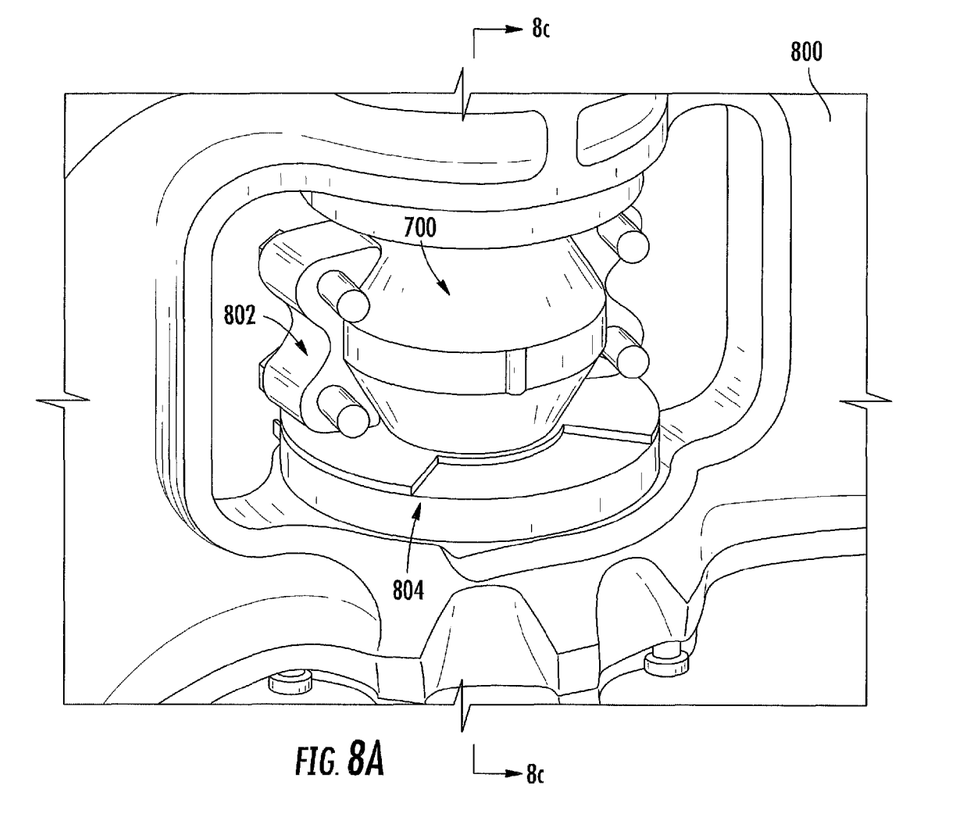
FIG. 8A is a an inboard side view of another embodiment of a liquid inertia vibration eliminator unit according to the present disclosure as installed on an aircraft.
Figure 8B:
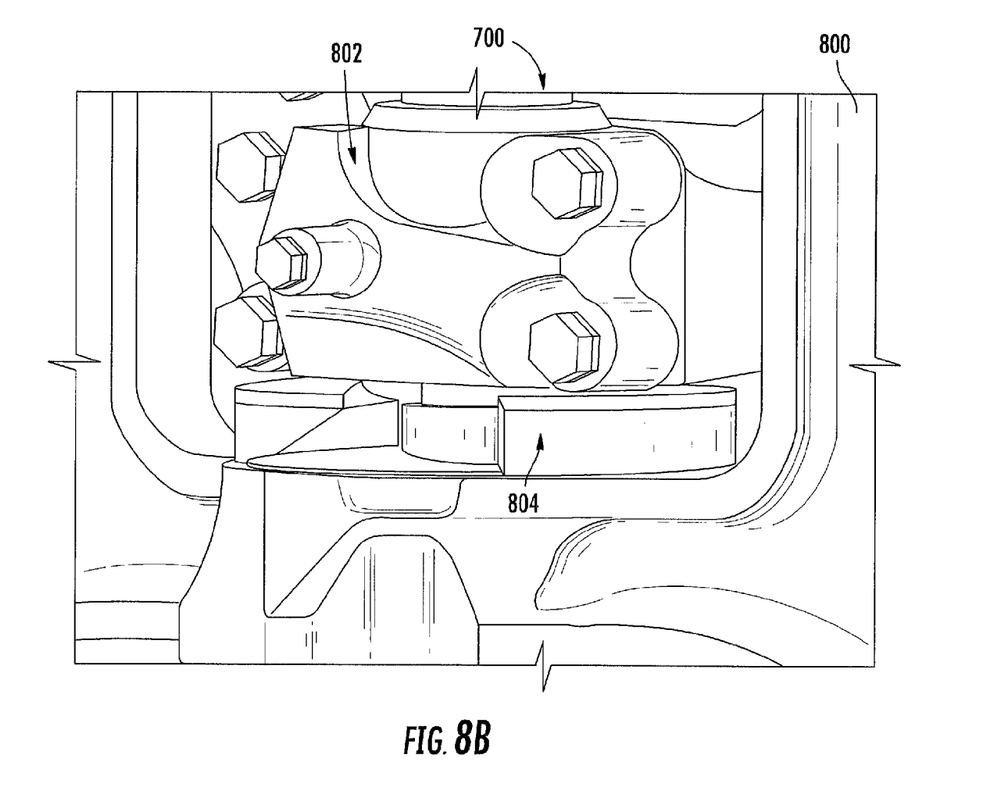
FIG. 8B is a an outboard side view of the liquid inertia vibration eliminator unit shown in FIG. 8A.
Figure 8C:
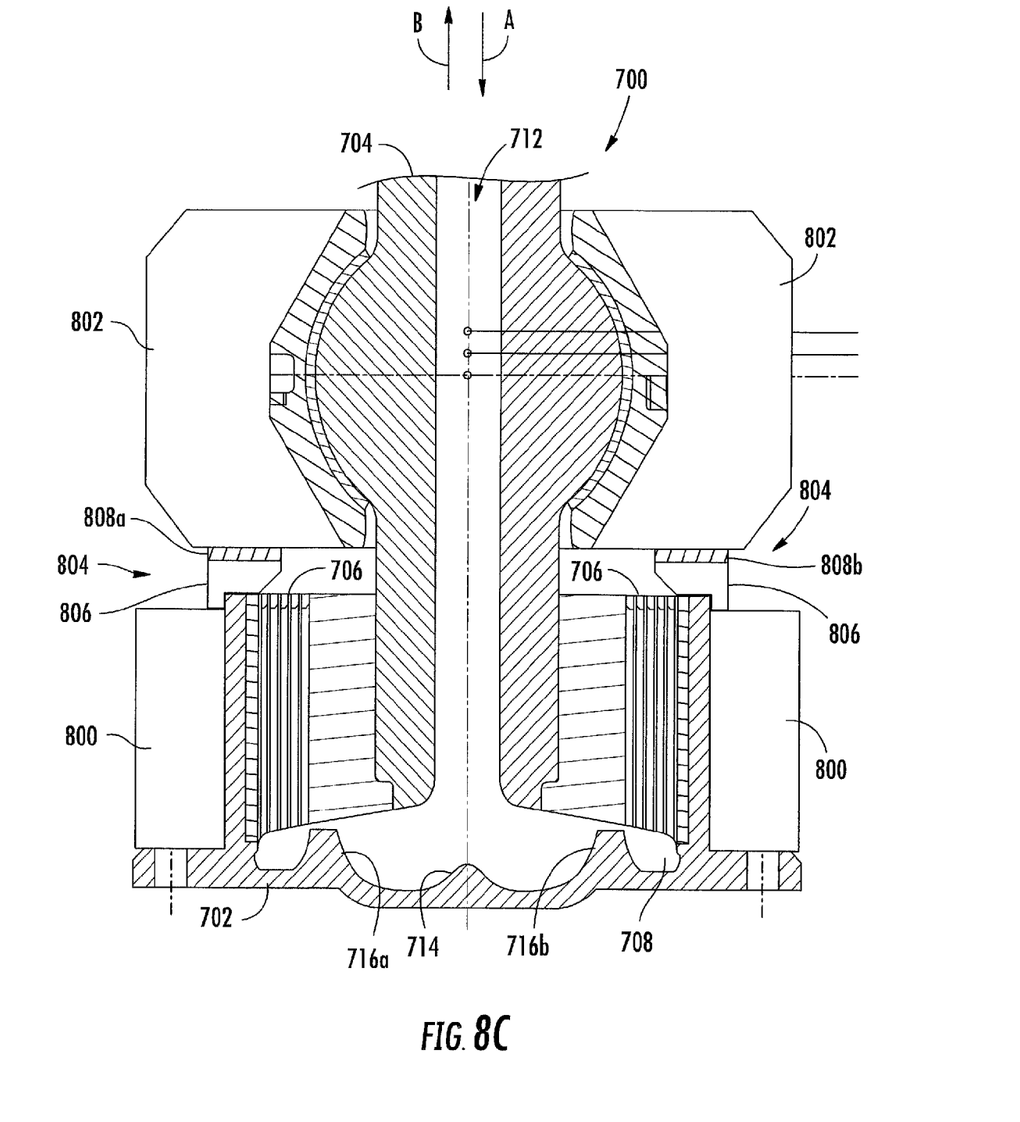
FIG. 8C is a cross-sectional view of the liquid inertia vibration eliminator unit shown in FIGS. 8A and 8B taken at 8b-8b in FIG. 8A.

Referring next to FIGS. 8A-8C, another alternative embodiment is shown as LIVE unit 700, which can also be used as the LIVE units 412*a* and 412*b* (FIG. 5). The LIVE unit 700 is particularly well-suited for use on a helicopter, but can also be used on other aircraft. FIG. 8A shows an inboard side view of the LIVE unit 700 as installed on an aircraft; FIG. 8B shows an outboard side view of the LIVE unit 700 as installed on an aircraft. The LIVE unit 700 is connected to an airframe (not shown) of an aircraft via a pylon support beam 800 similar to 404*a* and 404*b* (FIG. 5). The LIVE unit 700 is also connected to a pylon assembly (not shown) via a transmission attachment cap 802. A portion of the cap 802 is not shown in FIG. 8B in order that the LIVE unit 700 may be more clearly shown. In this embodiment, a C-ring assembly 804 is provided around at least a portion of the LIVE unit 700 between the transmission attachment cap 802 and the pylon support beam 800 similar to 404*a* and 404*b* (FIG. 5).

FIG. 8C shows a cross-sectional view of the LIVE unit 700. The LIVE unit 700 includes a housing 702 having a hollow, generally cylindrical interior. Housing 702 would typically be coupled to the fuselage of the aircraft, i.e., the body being isolated from the vibration. A piston 704 of selected cross-sectional diameter is disposed within the interior of housing 702. Piston 704 would typically be coupled to the pylon of the aircraft, i.e., the engine and transmission, which are a primary source of vibrations. An elastomeric seal and spring member 706 resiliently seals piston 704 within the interior of housing 702.

A fluid chamber 708 is defined by the interior of housing 702 and piston 704. A known-density, vibration-isolation fluid, also referred to as tuning fluid, is disposed within fluid chamber 708. Tuning fluid is preferably organic with non-corrosive properties having low-viscosity and high density, similar to the SPF I family of fluids available from Lord Corporation. In addition to sealing tuning fluid within fluid chamber 708, elastomeric member 706 functions as a spring to permit piston 704 to move or oscillate relative to housing 702, while maintaining piston 704 in a central location within housing 702 when no load is applied.

A tuning port 712 extends centrally through piston 704 and permits tuning fluid to move from one end of fluid chamber 708 to the other. A conical flow diverter 714 is provided at each end of housing 702 and is aligned with and generally opposes the opening at each end of tuning passage 712. Each conical flow diverter 714 enhances fluid flow by decelerating the vibration-isolation fluid as it flows from each end of the fluid chamber into and out of passage 712.

The housing 702 includes a plurality of downstops 716, including downstops 716*a* and 716*b*. The housing 702 can include an array of downstops, for example arranged in the same or similar manner as the downstops 516*a*-*d* are arranged in FIG. 6C.

The C-ring assembly 804 is provided around at least a portion of the LIVE unit 700 between the transmission attachment cap 802 and the pylon support beam 800 similar to 404*a* and 404*b* (FIG. 5).

Figure 9A:
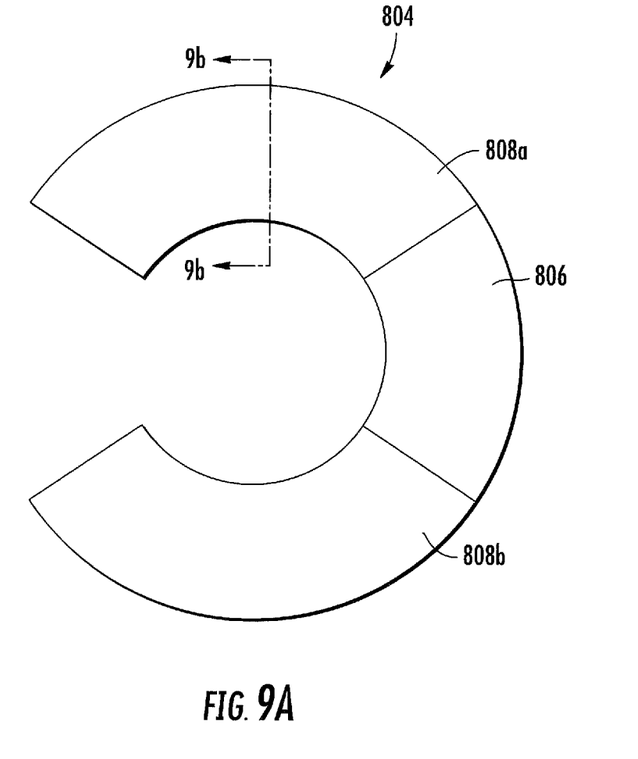
FIG. 9A is a plan view of the C-ring shown in FIGS. 8A-8C.
Figure 9B:
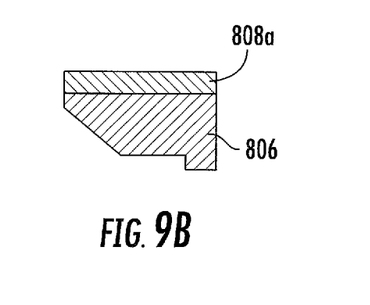
FIG. 9B is a cross-sectional view of the C-ring shown in FIG. 9A taken at 9b-9b in FIG. 9A.

Referring to FIG. 9A, a top view of an embodiment of the C-ring assembly 804 is illustrated. FIG. 9B shows a cross-sectional view of the C-ring assembly taken along section line 9*b*-9*b* shown in FIG. 9A. The C-ring assembly includes a rigid base 806, preferably formed of metal or other rigid material. Elastic layers 808*a* and 808*b*, for example formed of rubber, each extend over respective portions of the upper surface of the rigid base 806. The placement of the elastic layers 808*a* and 808*b* is chosen so that, when the C-ring assembly 804 is properly installed, the elastic layers will be positioned between the piston 704, or other elements rigidly connected to the piston 704 such as the cap 802, and the housing 702, or other elements rigidly connected to the housing 702 such as the support bracket 800. In alternative embodiments, a single continuous elastic layer can be used in place of separate layers 808*a* and 808*b* so long as the single elastic layer can still be positioned between the piston 704, or other elements rigidly connected to the piston 704 such as the cap 802, and the housing 702, or other elements rigidly connected to the housing 702 such as the support bracket 800.

Referring again to FIG. 8C, the piston 704 is movable relative to the housing 702 in the directions indicated by arrows A and B. From the position illustrated, the piston can move in the direction indicated by arrow A (down as shown in FIG. 8C) to a down position, where the travel of the piston is stopped by the C-ring 804, and from the down position in the direction indicated by arrow B (up as shown in FIG. 8C). The placement of the elastic layers 808*a* and 808*b* between the piston 704, or other elements rigidly connected to the piston 704 such as the cap 802, and the housing 702, or other elements rigidly connected to the housing 702 such as the support bracket 800, provides for a compliant base, rather than a hard base, for the pylon to rest on when the aircraft is on the ground. If the pylon rests on a hard surface, the pylon lateral mode natural frequency increases and approaches main rotor 4/rev harmonic frequency (i.e., blade passage frequency).

This resonant or near-resonant condition results in increased vibration levels, which are transferred to the fuselage through the downstop and housing. By incorporating the elastic members 808a and 808b, the pylon lateral mode natural frequency does not approach resonance with 4/rev; therefore, the vibration levels do not significantly increase when the pylon rests on the C-ring assembly 804 having the elastic layers 808a and 808b.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A vibration isolator, comprising:
   a housing defining a fluid chamber;
   a fluid disposed within the fluid chamber;
   a piston resiliently disposed within the housing and movable to and from a down position, the housing having one or more downstops;
   a means for resiliently coupling the piston to the housing; and
   an elastic element for reducing transmission of vibrations from the piston to the housing when the piston is at the down position, wherein the elastic element provides a compliant base for the piston to rest on when the piston is in the down position;
   wherein the elastic element is spaced apart from at least one of the piston and the downstop.

2. The vibration isolator according to claim 1, further comprising at least one downstop positioned so as to prevent the piston from traveling beyond the down position.

3. The vibration isolator according to claim 2, wherein the elastic element is positioned between the downstop and the housing.

4. The vibration isolator according to claim 2, wherein the elastic element is positioned between the piston and the downstop.

5. The vibration isolator according to claim 4, wherein the elastic element is connected to the piston.

6. The vibration isolator according to claim 5, wherein the elastic element is connected to the means for resiliently coupling the piston to the housing.

7. The vibration isolator according to claim 1, further comprising a C-ring that at least partially extends around the piston, wherein the elastic element is a layer of the C-ring.

8. The vibration isolator according to claim 7, wherein the C-ring further comprises a rigid base layer.

9. An aircraft, comprising:
   an airframe;
   a propulsion system carried by the airframe; and
   a vibration isolator disposed between the airframe and the propulsion system, the vibration isolator comprising:
   a housing defining a fluid chamber;
   a fluid disposed within the fluid chamber;
   a piston resiliently disposed within the housing and movable to and from a down position, the housing having one or more downstops;
   a means for resiliently coupling the piston to the housing; and
   an elastic element for reducing transmission of vibrations from the piston to the housing when the piston is at the down position, wherein the elastic element provides a compliant base for the piston to rest on when the piston is in the down position;
   wherein the elastic element is spaced apart from at least one of the piston and the downstop;
   whereby oscillatory forces generated by the propulsion system are reduced.

10. The aircraft according to claim 9, further comprising at least one downstop positioned so as to prevent the piston from traveling beyond the down position.

11. The aircraft according to claim 10, wherein the elastic element is positioned between the downstop and the housing.

12. The aircraft according to claim 10, wherein the elastic element is positioned between the piston and the downstop.

13. The aircraft according to claim 12, wherein the elastic element is connected to the piston.

14. The aircraft according to claim 13, wherein the elastic element is connected to the means for resiliently coupling the piston to the housing.

15. The aircraft according to claim 9, further comprising a C-ring that at least partially extends around the piston, wherein the elastic element is a layer of the C-ring.

16. The aircraft according to claim 15, wherein the C-ring further comprises a rigid base layer.

17. A method of vibration isolation, comprising:
    providing a housing defining a fluid chamber;
    providing a fluid disposed within the fluid chamber;
    providing a piston resiliently disposed within the housing and movable to and from a down position, the housing having one or more downstops;
    providing a means for resiliently coupling the piston to the housing; and
    reducing transmission of vibrations from the piston to the housing when the piston is at the down position via an elastic element, the elastic element providing a compliant base for the piston to rest on when the piston is in the down position;
    wherein the elastic element is spaced apart from at least one of the piston and the downstop.

18. The method according to claim 17, further comprising:
    providing at least one downstop positioned so as to prevent the piston from traveling beyond the down position; and
    providing the elastic element between the downstop and the housing.

19. The method according to claim 17, further comprising:
    providing at least one downstop positioned so as to prevent the piston from traveling beyond the down position; and
    providing the elastic element between the piston and the downstop.

20. The method according to claim 17, further comprising:
    providing a C-ring that at least partially extends around the piston; and
    providing the elastic element as a layer of the C-ring.

* * * * *